US006201430B1

(12) United States Patent
Hagino et al.

(10) Patent No.: US 6,201,430 B1
(45) Date of Patent: Mar. 13, 2001

(54) COMPUTATIONAL CIRCUIT

(75) Inventors: Hideyuki Hagino, Kumagaya; Susumu Hoshino, Yokohama, both of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/459,889

(22) Filed: Dec. 14, 1999

(30) Foreign Application Priority Data

Dec. 15, 1998 (JP) ........................................ 10-356020

(51) Int. Cl.[7] ........................................ G06F 7/556
(52) U.S. Cl. .......................... 327/349; 327/355; 327/361
(58) Field of Search .................................. 327/355, 361, 327/349, 346, 352, 356

(56) References Cited

U.S. PATENT DOCUMENTS

| | | | | |
|---|---|---|---|---|
| 4,047,059 | * | 9/1977 | Rosenthal | 327/361 |
| 5,581,211 | | 12/1996 | Kimura | 327/356 |
| 5,617,053 | * | 4/1997 | Shou et al. | 327/361 |
| 5,783,954 | * | 7/1998 | Kholfman et al. | 327/355 |
| 6,107,858 | * | 8/2000 | Kimura | 327/361 |

* cited by examiner

*Primary Examiner*—Toan Tran
(74) *Attorney, Agent, or Firm*—Oblon, Spivak, McClelland, Maier & Neustadt, P.C.

(57) ABSTRACT

The computational circuit adds a drain current of a first MIS transistor which is driven by inputting a signal obtained by superimposing an AC signal to a DC voltage, and a drain current of a second MIS transistor which is driven by inputting a signal obtained by superimposing the same AC signal as above but reversal in phase to the DC voltage, and subtracts a drain current of a third MIS transistor driven by supplying the DC voltage to the gate thereof so as to erase DC components of the outputs of the first and second MIS transistors. Thereby, it is possible to produce a current in proportional to square of the AC signal.

18 Claims, 2 Drawing Sheets

COMPUTATIONAL CIRCUIT

BACKGROUND OF THE INVENTION

The present invention relates to a computational circuit, and more specifically, to a squaring circuit using a MOS or MIS transistor.

Hitherto, MOS transistors are exclusively employed in digital circuits using digital signals "0" and "1". On the other hand, recently, it has been increasingly desired for the MOS transistor to handle analog signals. For example, a squaring circuit is required for a full wave rectification of a small alternating-current signal. In this case, if the signal is digitally processed, it is necessary to employ an AD converter circuit, a digital squaring circuit, and a DA converter circuit, which result in increases of a chip size and a manufacturing cost.

On the other hand, the MOS transistor is characterized in that a drain current having a component in proportion to square of an input voltage between a gate and a source is output. Assuming that the voltage between the gate and the source is represented by Vgs and a threshold voltage is represented by Vth, the drain current Id is given by the following equation:

$$Id=K(Vgs-Vth)^2 \quad (1)$$

where K is a constant in relation to a gate length and width (see "Ultrafast MOS device edited by Koyama Shin, Baifu kan, Tokyo, page 8).

However, as is apparent from the equation (1), the output current Id includes a component associated with the threshold voltage Vth. Therefore, the output current is largely distorted.

In the method in which a squared alternating-current signal is obtained by using the formula (1), an element associated with the threshold voltage is included. As a result, only a signal largely distorted is obtained.

BRIEF SUMMARY OF THE INVENTION

An object of the present invention is to provide a MOS or MIS computational circuit for obtaining a squared alternating-current signal without distortion.

To attain the aforementioned object, the computational circuit according to a first aspect of the present invention comprises:

a first MIS transistor having a gate to which a first input signal is applied;

a second MIS transistor having a gate to which a second input signal is applied and having substantially the same current driving ability as that of the first MIS transistor;

a third MIS transistor having a gate to which a signal obtained by adding the first input signal and the second input signal is applied; and an adding-subtracting circuit for adding a drain current of the first MIS transistor and a drain current of the second MIS transistor to obtain an addition result, subtracting a current corresponding to a substantially two-fold drain current of that of the first MIS transistor from the addition result on the basis of a drain current of the third MIS transistor, and outputting a subtraction result, wherein when a signal obtained by superimposing a first AC signal to a first DC voltage is supplied as the first input signal, and a signal obtained by superimposing a second AC signal having the same absolute value peak voltage as the first AC signal and a reversed phase of the first AC signal to a second DC voltage having the approximately same voltage as the first DC voltage is supplied as the second input signal, a squared signal of the first AC signal of the first input signal is output as the subtracting result from the adding-subtracting circuit.

A computational circuit according to a second aspect of the present invention comprising:

a first MIS transistor having a gate to which a first input signal is applied, and having a channel of a first conductivity type;

a second MIS transistor having a gate to which a second input signal is applied, having a channel of the first conductivity type and having substantially the same current driving ability as that of the first MIS transistor;

a third MIS transistor having a gate to which a signal obtained by adding the first input signal to the second input signal is applied, and having a channel of the first conductivity type;

an adding-subtracting circuit for adding a first drain current of the first MIS transistor and a second drain current of the second MIS transistor to obtain an addition result, subtracting a current corresponding to a substantially tow-fold drain current of that of the first MIS transistor from the addition result, based on a third drain current of the third MIS transistor, and outputting a subtraction result; and an output terminal to which the subtraction result of the adding-subtracting circuit is output, wherein each source of the first, the second and the third MIS transistors is connected to a first power supply potential and the adding-subtracting circuit includes fourth and fifth MIS transistors each having a channel of a second conductivity type, and each source of the fourth and the fifth MIS transistor is connected to a second power supply potential, gates of the fourth and the fifth MIS transistors are connected in common to a drain of the fifth MIS transistor, the drain of the fifth MIS transistor is connected to a drain of the third MIS transistors, and a drain of the fourth MIS transistor is connected to drains of the first and the second MIS transistors and the output terminal.

In the present invention, an alternating-current signal having a frequency component is input to the first MIS transistor gate. A signal identical in frequency to signal input to the first MIS transistor but reversal in phase is input to the second MIS transistor. Furthermore, a direct-current component input to the first and second MIS transistors is input to the third MIS transistor. It is therefore possible to obtain a squared signal of the alternating-current component by subtracting a direct current which is twice the drain current of the first or second MIS transistor on the basis of the drain current of the third MIS transistor from the drain currents of the first and second MIS transistors. Therefore, squared alternating current component less in distortion and independent of a threshold of a transistor can be obtained.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Now, embodiments of the present invention will be explained with reference to the accompanying drawing.

(First Embodiment 1)

Figure 1:
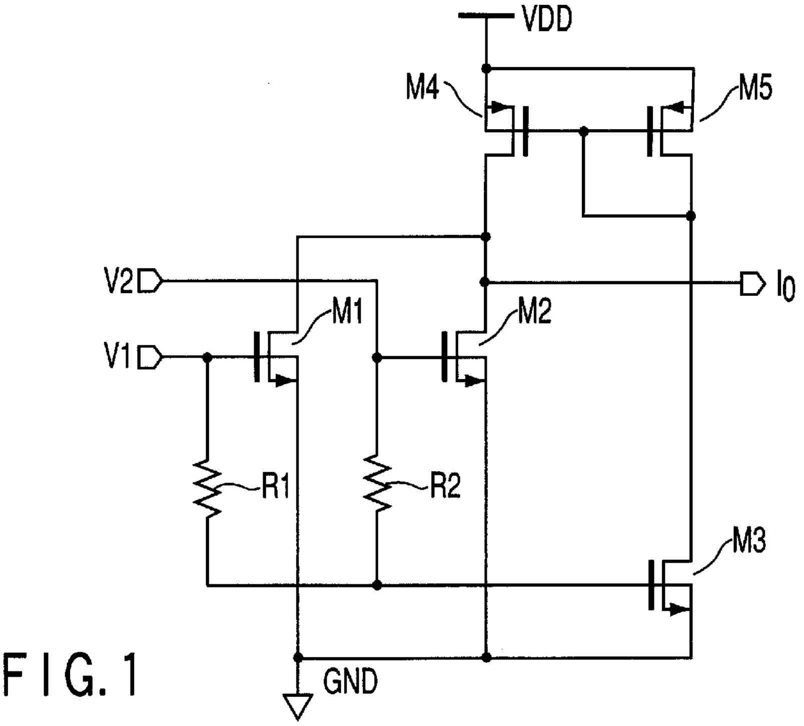
FIG. 1 is a circuit diagram of a computational circuit according to a first embodiment of the present invention.

FIG. 1 is a circuit diagram of a squaring circuit according to the first embodiment of the present invention. In FIG. 1, a reference symbol VDD denotes a direct current (DC) potential which is connected to a positive pole of a DC power source (not shown). A reference numeral GND denotes a ground point and connected to a negative pole of the DC power source.

An input signal V1 is applied to the gate of an NMOS transistor M1 and an input signal V2 is applied to the gate of an NMOS transistor M2. The input signals V1 and V2 are input to the gate of an NMOS transistor M3 via resistors R1 and R2, respectively. The sources of the NMOS transistors M1, M2, M3 are connected individually to ground points GND.

The drain of the NMOS transistor M3 is connected to the gate and the drain of a PMOS transistor M5 and the gate of a PMOS transistor M4. The PMOS transosotors M4 and M5 constitute a current mirror circuit. Each source of the PMOS transistors M4 and M5 is connected to the DC potential VDD.

The drain of the NMOS transistor M1 is connected to the node of the drain of the NMOS transistor M2 and the drain of the PMOS transistor M4. An output current Io is taken out from the node.

Assuming that the input signal V1 is divided into a direct-current component VG and an alternate-current (AC) component v1 in the aforementioned circuit arrangement and that V1, VG, and v1 satisfy the relationship: V1=VG+v1, a drain current IdM1 of the NMOS transistor M1 is given by the following equation:

$$IdM1=K[(VG+v1)-Vth]^2=K(VG^2+v1^2+2VGv1+Vth^2-2VthVG-2Vthv1) \quad (2)$$

Assuming that the input signal V2 is an inverted signal of the input signal V1, the input signal V2 is represented by VG−v1. If an NMOS transistor, which has the same gate width, in other words, the same current driving ability as that of the NMOS transistor M1, is employed as the NMOS transistor M2, a drain current IdM2 of the NMOS transistor M2 is given by the following equation:

$$IdM2=K[(VG-v1)-Vth]^2=K(VG^2+v1^2-2VGv1+Vth^2-2VthVG+2Vthv1) \quad (3)$$

When resistors R1 and R2 are set equally, alternating-current components of the input signals V1 and V2 are canceled out at the gate of NMOS transistor M3, with the result that only the direct-current component VG of the input signal is applied to the gate of the NMOS transistor M3. When an NMOS transistor having a gate width which is twice that of the NMOS transistor M1 or a gate length which is half that of the NMOS transistor M1 is used as the NMOS transistor M3, a drain current IdM3 of the NMOS transistor M3 is given by the following equation:

$$IdM3=2K(VG-Vth)^2=K(2VG^2+2Vth^2-4VthVG) \quad (4)$$

Since the PMOS transistors M4 and M5 have the same current driving ability and both work as a current mirror circuit, the relationship between the drain currents IdM4 and IdM5 of the PMOS transistors M4 and M5 is defined as IdM4=IdM5=IdM3. Hence, an output current Io is expressed by the following equation:

$$Io=IdM1+IdM2-IdM3=2Kv1^2 \quad (5)$$

If the circuit having the above-mentioned arrangement is used, a signal obtained by squaring an alternate-current component of the input signal having no distortion.

Figure 2:
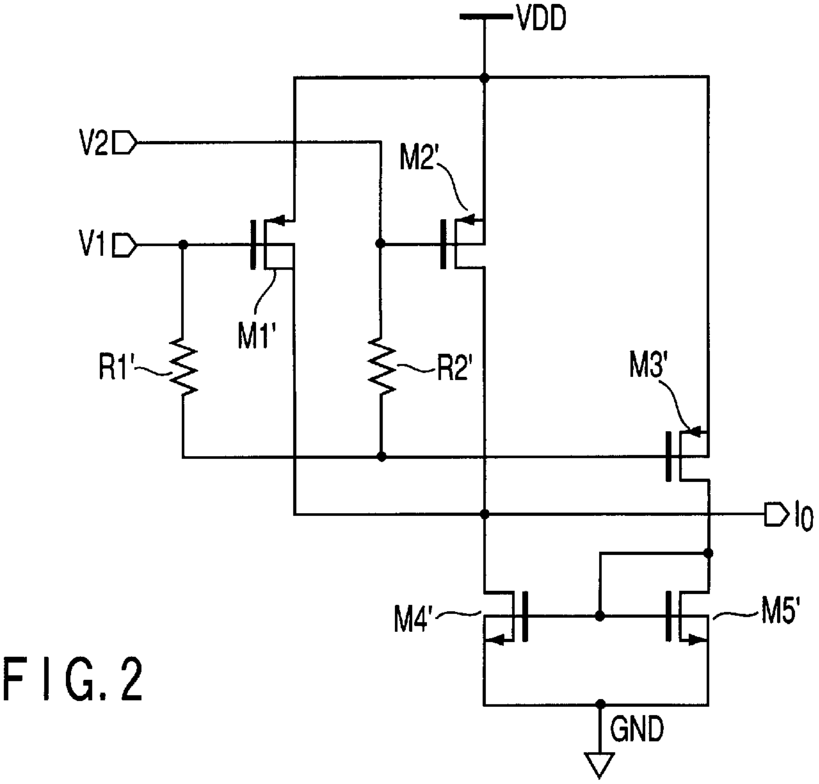
FIG. 2 is a circuit diagram of a computational circuit according to a modification of the first embodiment of the present invention.

In the aforementioned embodiments, the NMOS transistors are used as the transistors M1 to M3 and the PMOS transistors are used as the transistors M4 and M5. However, the N type transistor and the P-type transistor may be used interchangeably. FIG. 2 shows an embodiment in which the PMOS transistors are used as transistors M1' to M3', and the NMOS transistors are used as transistors M4' and M5'.

(Second Embodiment)

Figure 3:
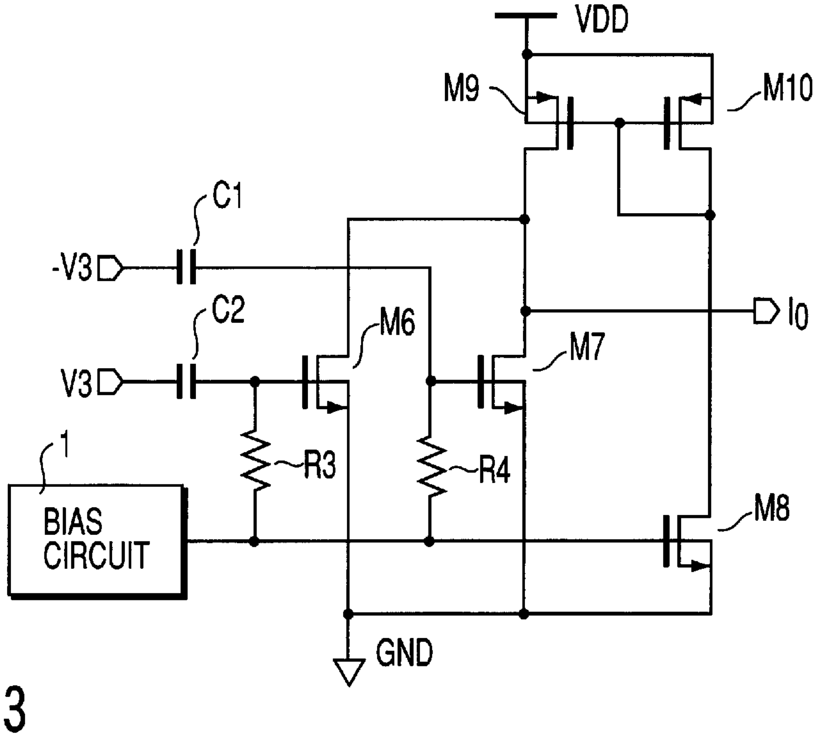
FIG. 3 is a circuit diagram of a computational circuit according to a second embodiment of the present invention.

FIG. 3 is a circuit diagram of a squaring circuit according to the second embodiment of the present invention. In FIG. 3, a reference symbol VDD denotes a direct current (DC) potential and connected to a positive pole of a DC power source (not shown). A reference symbol GND denotes a ground point and connected to a negative pole of the DC power source.

Output from a bias circuit 1 is input to the gate of the NMOS transistor M6 via a resistor R3 and an input signal V3 is input to the gate of the transistor M6 via a capacitor C2. Output from the bias circuit 1 is input to the gate of an NMOS transistor M7 via a resistor R4 and an input signal V3 is input to the gate of the transistor M7 via a capacitor C1.

Output from the bias circuit 1 is applied to the gate of an NMOS transistor M8. The sources of NMOS transistors M6, M7, M8 are connected individually to a ground point GND. The drain of the NMOS transistor M8 is connected to the gate and drain of a PMOS transistor M10 and the gate of a PMOS transistor M9. The PMOS transistors M8 and M9 constitute a current mirror circuit.

The sources of the PMOS transistors M9 and M10 are connected individually to a DC potential VDD. The drain of an NMOS transistor M6 is connected to a node of the drains of NMOS transistors M7 and M9. An output current Io is taken out from the node.

Assuming that input signal V3 is represented by v1 (AC signal voltage), input signal −V3 by −v1, and output voltage of a bias circuit 1 is represented by VG (DC voltage), a voltage VG+v1 is applied to the gate of the NMOS transistor M6, a voltage VG−v1 is applied to the gate of the NMOS transistor M7, and a voltage VG is applied to the gate of the NMOS transistor MB.

The drain current IdM6 of the NMOS transistor M6 is expressed by the following equation, in the same manner as in the first embodiment:

$$IdM6=K[(VG+v1)-Vth]^2=K(VG^2+v1^2+2VGv1+Vth^2-2VthVG-2Vthv1) \quad (6)$$

Furthermore, the drain current IdM7 of the NMOS transistor M7 is given by the following equation:

$$IdM7=K[(VG-v1)-Vth]^2=K(VG^2+v1^2-2VGv1+Vth^2-2VthVG+2Vthv1) \quad (7)$$

Furthermore, the voltage to be applied to the gate of the NMOS transistor M8 is a DC potential VG of the bias circuit 1. If an NMOS transistor having a gate width which is twice that of the NMOS transistor M6 or a gate length which is half that of the NMOS transistor M6, is used as the NMOS transistor M8, a drain current IdM8 of the NMOS transistor M8 is given by the following equation:

$$IdM8=2K(VG-Vth)^2=K(2VG^2+2Vth^2-4VthVG) \quad (8)$$

Since the PMOS transistors M9 and M10 have the same current driving ability and both work as a current mirror circuit, the relationship between the drain current IdM9 of the PMOS transistor M9 and the drain current IdM10 of the PMOS transistor M10 is set as IdM9=IdM10=IdM8. Hence, an output current Io is expressed by the following equation:

$$Io=IdM6+IdM7-IdM8=2Kv1^2 \quad (9)$$

If the circuit having the above-mentioned arrangement is used, it is possible to obtain a squared signal of an alternate-current component of the input signal without distortion.

In the second embodiment, an N-type transistor and a P type transistor may be used interchangeably, similarly to the first embodiment.

(Third Embodiment)

Figure 4:
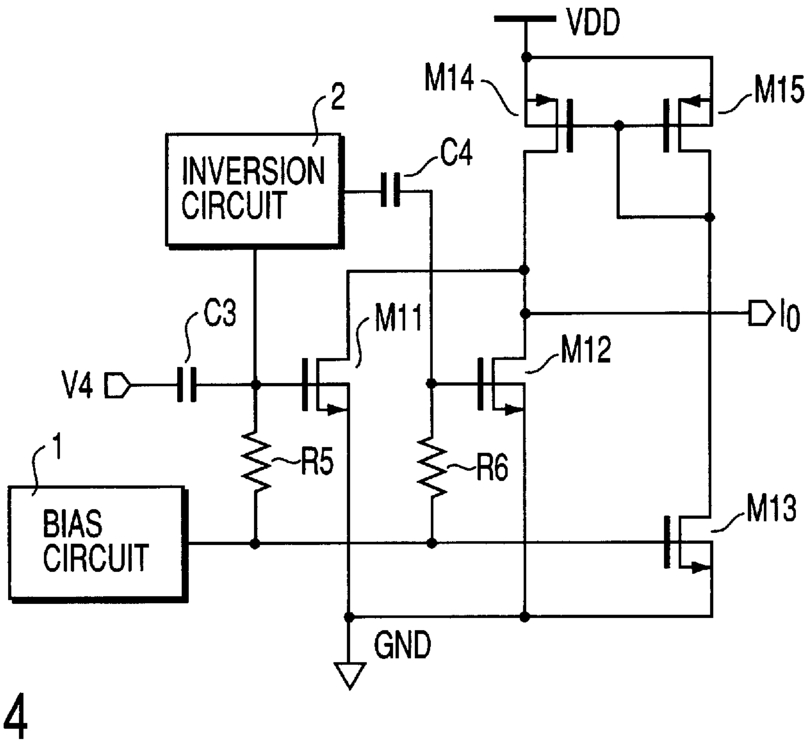
FIG. 4 is a circuit diagram of a computational circuit according to a third embodiment of the present invention.

FIG. 4 is a circuit diagram of a squaring circuit according to the third embodiment of the present invention. In FIG. 4, a reference symbol VDD denotes a direct current (DC) potential and connected to a positive pole of a DC power source (not shown). A reference symbol GND denotes a ground point and connected to a negative pole of the DC power source.

Output from a bias circuit 1 is input to the gate of the NMOS transistor M11 via a resistor R5 and an input signal V4 is input to the gate via a capacitor C3. Output from the bias circuit 1 is input into the gate of an NMOS transistor M12 via a resistor R6 and a gate voltage of the NMOS transistor M11 is input via an inversion circuit 2 and a capacitor C4. Note that the same bias circuit 1 as in the second embodiment can be used.

Output from the bias circuit 1 is applied to the gate of an NMOS transistor M13. The sources of NMOS transistors M11, M12 and M13 are connected individually to a ground point, GND. The drain of the NMOS transistor M13 is connected to the gate and drain of a PMOS transistor M15 and the gate of a PMOS transistor M14. The PMOS transistors M15 and M14 constitute a current mirror circuit. The sources of the PMOS transistors M14 and M15 are connected individually to the DC potential VDD. The drain of an NMOS transistor M11 is connected to a node of the drain of NMOS transistors M12 and the drain of PMOS transistor M14. An output current Io is taken out from the node.

Assuming that an input signal V4 is represented by v1 (AC signal voltage) and an output voltage of the bias circuit by VG (DC voltage), an AC signal to be input into the inversion circuit 2 can be expressed by v1 and an output voltage by −v1. As a result, a voltage of VG+v1 is applied to the gate of the NMOS transistor M11 and a voltage of VG−v1 is applied to the gate of the NMOS transistor M12. Furthermore, a voltage of VG is applied to the gate of the NMOS transistor M13.

As is the same as in the first embodiment, a drain current IdM11 of the NMOS transistor M11 is given by the following equation:

$$IdM11=K[(VG+v1)-Vth]^2=K(VG^2+v1^2+2VGv1+Vth^2-2VthVG-2Vthv1) \quad (10)$$

Furthermore, the drain current IdM12 of the NMOS transistor M12 is given by the following equation:

$$IdM12=K[(VG-v1)-Vth]^2=K(VG^2+v1^2-2VGv1+Vth^2-2VthVG+2Vthv1) \quad (11)$$

Furthermore, the voltage to be applied to the gate of the NMOS transistor M13 is a DC voltage VG of the bias circuit 1. Therefore, if an NMOS transistor, which has the same gate width as that of the NMOS transistor M11, in other words, the same current driving ability, is employed as the NMOS transistor M13, a drain current IdM13 of the NMOS transistor M13 is given by the following equation:

$$IdM13=K(VG-vth)^2=K(VG^2+2Vth^2-2VthVG) \quad (12)$$

The PMOS transistors M14 and M15 work as a current mirror circuit. The gate width of the PMOS transistor M14 is set substantially twice as large as that of the PMOS transistor M15 or the gate length of the PMOS transistor M14 is set substantially a half as long as that of the PMOS transistor M15. In other words, the current driving ability of the PMOS transistor M14 is set substantially twice as large as that of the PMOS transistor M15. If so, the relationship between a drain current IdM14 of the PMOS transistor M14 and a drain current IdM15 of the PMOS transistor M15 is given by $$IdM14=2IdM15=2IdM13.$$

Therefore, an output current Io is expressed by the following equation:

$$Io=IdM11+IdM12-2IdM13=2Kv1^2 \quad (13)$$

If the circuit having the above-mentioned arrangement is used, it is possible to obtain a squared signal of an alternate-current component of the input signal without distortion.

In the third embodiment, the P-type transistor and the N-type transistor can be interchangeably used in the same as in the first embodiment.

In the foregoing, the present invention has been explained based on the embodiments. The present invention is not limited to the aforementioned embodiments and can be modified in various ways within the gist of the present invention. For example, in the first and second embodiments, the gate widths of the NMOS transistor M3 and M8 are set twice as wide as those of the NMOS transistor M1 and M6, respectively. However, they may be the same as in the third embodiment. Furthermore, a ratio MG in gate width between two PMOS transistors constituting the current mirror circuit, more specifically, ratios of MG4/MG5, MG9/MG10 are set at 2, respectively. Alternatively, the gate width of the NMOS transistor M13 of the third embodiment is twice as wide as the gate width of the transistor M11, and the gate widths of the PMOS transistors M14 and M15 of the current mirror circuit may be substantially equal. If the current mirror circuit is arranged in this manner, it is possible to erase a direct current component and a threshold component from the output current Io.

The first through third embodiments employed MOS transistors. However, MIS transistors, in which various types of dielectrics not restricted to silicon oxide are used as a gate insulating film, can also be used instead of MOS transistors in the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A computational circuit comprising:

a first MIS transistor having a gate to which a first input signal is applied;

a second MIS transistor having a gate to which a second input signal is applied and having substantially the same current driving ability as that of the first MIS transistor;

a third MIS transistor having a gate to which a signal obtained by adding the first input signal and the second input signal is applied; and an adding-subtracting circuit for adding a drain current of the first MIS transistor and a drain current of the second MIS transistor to obtain an addition result, subtracting a current corresponding to a substantially two-fold drain current of that of the first MIS transistor from the addition result on the basis of a drain current of the third MIS transistor, and outputting a subtraction result, wherein when a signal obtained by superimposing a first AC signal to a first DC voltage is supplied as the first input signal, and a signal obtained by superimposing a second AC signal having the same absolute value peak voltage as the first AC signal and a reversed phase of the first AC signal to a second DC voltage having the approximately same voltage as the first DC voltage is supplied as the second input signal, a squared signal of the first AC signal of the first input signal is output as the subtraction result from the adding-subtracting circuit.

2. The computational circuit according to claim 1, wherein the third MIS transistor has a substantially two-fold current driving ability of that of the first MIS transistor.

3. The computational circuit according to claim 1, wherein the adding-subtracting circuit includes a current mirror circuit.

4. The computational circuit according to claim 1, further comprising first and second input terminals, the gate of the first MIS transistor and the gate of the second MIS transistor being connected to the first and the second input terminals, respectively.

5. The computational circuit according to claim 4, wherein the gate of the third MIS transistor is connected to the first and the second input terminals through resistors of a substantially same value, respectively.

6. The computational circuit according to claim 1, further comprising:

a first input terminal to be connected to the gate of the first MIS transistor through a first capacitor;

a second input terminal to be connected to the gate of the second MIS transistor through a second capacitor; and a bias circuit for supplying a DC bias voltage to the gates of the first and the second MIS transistor, wherein AC signals identical in absolute value of a peak voltage and frequency and reversal in phase are supplied to the first and the second input terminals, respectively.

7. The computational circuit according to claim 6, wherein the bias circuit directly supplies the DC bias voltage to the gate of the third MIS transistor.

8. The computational circuit according to claim 1, further comprising:

an input terminal to be connected to the gate of the first MIS transistor through a first capacitor and supplied with an AC signal;

an inversion circuit having an input terminal to which the gate of the first MIS transistor is connected, an output terminal of the inversion circuit being connected to the gate of the second MIS transistor through a second capacitor; and a bias circuit for supplying a DC bias voltage to the gates of the first and the second MIS transistors.

9. The computational circuit according to claim 8, wherein the bias circuit directly supplies the DC bias voltage to the gate of the third MIS transistor.

10. A computational circuit comprising:

a first MIS transistor having a gate to which a first input signal is applied, and having a channel of a first conductivity type;

a second MIS transistor having a gate to which a second input signal is applied, having a channel of the first conductivity type and having substantially the same current driving ability as that of the first MIS transistor;

a third MIS transistor having a gate to which a signal obtained by adding the first input signal to the second input signal is applied, and having a channel of the first conductivity type;

an adding-subtracting circuit for adding a first drain current of the first MIS transistor and a second drain current of the second MIS transistor to obtain an addition result, subtracting a current corresponding to a substantially two-fold drain current of that of the first MIS transistor from the addition result, based on a third drain current of the third MIS transistor, and outputting a subtraction result; and an output terminal to which the subtraction result of the adding-subtracting circuit is outputted, wherein each source of the first, the second and the third MIS transistors is connected to a first power supply potential and the adding-subtracting circuit includes fourth and fifth MIS transistors each having a channel of a second conductivity type, and each source of the fourth and the fifth MIS transistors is connected to a second power supply potential, gates of the fourth and the fifth MIS transistors are connected in common to a drain of the fifth MIS transistor, the drain of the fifth MIS transistor is connected to a drain of the third MIS transistor, and a drain of the fourth MIS transistor is connected to drains of the first and the second MIS transistors and the output terminal.

11. The computational circuit according to claim 10, wherein the third MIS transistor has a substantially two-fold current driving ability of that of the first MIS transistor and the fourth and the fifth MIS transistors have substantially the same current driving ability.

12. The computational circuit according to claim 10, wherein the third MIS transistor has substantially the same current driving ability as that of the first MIS transistor, and the fourth MIS transistor has a substantially two-fold current driving ability of that of the fifth MIS transistor.

13. The computational circuit according to claim 10, further comprising first and second input terminals, the gate of the first MIS transistor and the gate of the second MIS transistor are connected directly to the first and the second input terminals, respectively.

14. The computational circuit according to claim 13, wherein the gate of the third MIS transistor is connected to the first and the second input terminals through resistors of a substantially same value, respectively.

15. The computational circuit according to claim 10, further comprising:

a first input terminal to be connected to the gate of the first MIS transistor through a first capacitor;

a second input terminal to be connected to the gate of the second MIS transistor through a second capacitor; and a bias circuit for supplying a DC bias voltage to the gates of the first and the second MIS transistors, wherein AC signals identical in absolute value of a peak voltage and frequency and reversal in phase are supplied to the first and the second input terminals, respectively.

16. The computational circuit according to claim 15, wherein the bias circuit directly supplies the DC bias voltage to the gate of the third MIS transistor.

17. The computational circuit according to claim 10, further comprising:

an input terminal to be connected to the gate of the first MIS transistor through a first capacitor and supplied with an AC signal;

an inversion circuit having an input terminal to which the gate of the first MIS transistor is connected, an output terminal of the inversion circuit being connected to the gate of the second MIS transistor through a second capacitor; and a bias circuit for supplying a DC bias voltage to the gates of the first and the second MIS transistors.

18. The computational circuit according to claim 17, wherein the bias circuit directly supplies the DC bias voltage to the gate of the third MIS transistor.

* * * * *